Sept. 8, 1925.
O. A. ANDERSON
GEAR SHIFT LEVER
Filed April 25, 1921
1,552,408
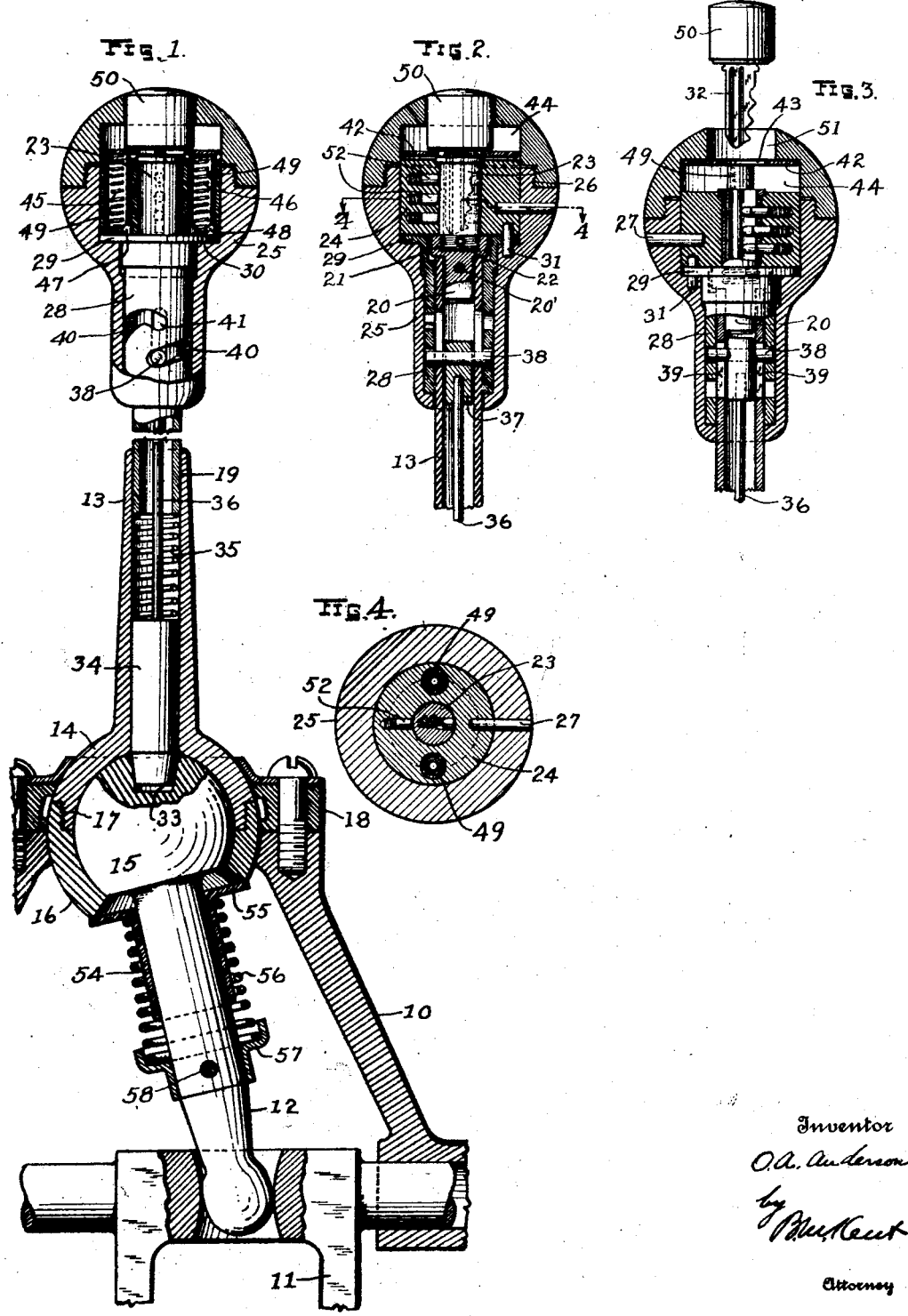

Patented Sept. 8, 1925.

1,552,408

UNITED STATES PATENT OFFICE.

OLAF A. ANDERSON, OF HAMILTON, OHIO.

GEAR-SHIFT LEVER.

Application filed April 25, 1921. Serial No. 464,121.

*To all whom it may concern:*

Be it known that I, OLAF A. ANDERSON, a citizen of the United States, and a resident of Hamilton, county of Butler, State of Ohio, have invented certain new and useful Improvements in Gear-Shift Levers, of which the following is a specification.

This invention relates to locking devices for motor vehicles and more particularly to devices for rendering the usual gear-shift lever of a motor vehicle inoperative.

One of the objects of the invention is to provide a device of the type referred to by which the gear-shift lever may be rendered inoperative in any of its positions and without regard to whether the gears are in mesh or in neutral. A further object of the invention is to provide a locking device which will render the gear-shift lever ineffective to shift the gears although permitting the lever to be moved freely in any direction.

Another object of the invention is to provide a locking device which may be controlled by a key adapted to be inserted in a lock at the top of the gear-shift lever and in which the key will be entirely housed within the usual knob at the top of the lever when the lever is operative.

Other objects of the invention and the features of novelty will be apparent from the following description taken in connection with the accompanying drawings, of which:

Figure 1 is a longitudinal section through a gear-shift lever and a portion of a gear case, embodying my invention;

Fig. 2 is a longitudinal section of the upper part of the gear-shift lever, this section being on a plane at right angles to Fig. 1;

Fig. 3 is a section similar to Fig. 2 but shows the mechanism in the "locked" position;

Fig. 4 is a transverse section on the line 4—4 of Fig. 2.

Referring to the drawings 10 indicates a part of the casing for the ordinary selective type of transmission gearing, such as is commonly used on motor vehicles, and 11 represents a gear shifting member which is actuated by the lever 12. In the usual construction the lever 12 would be the lower end of a solid gear-shift lever which projects upwardly from the gear casing to a convenient position to be actuated by the operator of the vehicle, as is indicated generally by Fig. 1, but according to my invention, as specifically illustrated in Fig. 1, this lever is in two sections of which the part 12 is the lower section and the part 13 is the upper or handle section. The section 13 is of tubular form and has at its lower end an enlargement 14 having a spherical socket to receive the ball 15 at the upper end of the lever 12. A part 16 is secured to the lower end of the enlargement 14, by screw threads 17 and serves to retain the ball 15 in the socket in the enlargement 14. The outer surface of the enlargement 14 and of the part 16 are of spherical form and concentric with the ball 15 and this spherical lower end of the section 13 of the gear-shift lever is seated and suitably held in a spherical socket formed in the top wall of the casing 10 and the cover plate 18, this construction permitting universal movement of the handle section 13 as is customary in gear-shift levers.

The handle section 13 of the lever may be constructed in any preferred manner but I have shown it as comprising two tubular parts which are telescoped and rigidly secured together at 19. There is rigidly secured in the upper end of the handle 13, by a pin 20' or in any other suitable manner a plug or adapter 20 which, in turn, has rigidly secured to it, as by the threads 21 and pin 22, the barrel 23 of a pin lock. The cylinder 24 of this lock is housed in an opening in the knob 25, said knob being formed of two sections which are screwed together at 26. The cylinder 24 and knob 25 are secured together against relative rotation by the pin 27. A sleeve 28 has a flange 29 arranged between the bottom of the cylinder 24 and a shoulder 30 in the knob and is held against rotation relative to the knob by a pin 31. The lock comprising the barrel 23 and cylinder 24 therefore serves to secure the knob 25 against rotation on the handle 13 when the key 32 is removed from the barrel 23 according to the well known principle of the pin lock illustrated.

Referring to Fig. 1 it will be noted that the ball 15 has a recess or socket 33 to receive the end of a bolt 34 which is slidably fitted in the handle 13 and is adapted to form a rigid connection between the lever 12 and handle 13 so that these parts, when thus connected, act as a unit and the same as the ordinary solid gear-shift lever. A spring 35 bears upon the upper end of the bolt 34 and serves to force the bolt into and retain it in the socket 33. A rod 36 is attached to the upper end of the bolt 34 and has its upper end secured in a block 37 that is slidable in the handle 13 and carries a cross-pin 38, the opposite ends of which project through the elongated slots 39 in the handle 13 and into the spiral slots 40 in the sleeve 28. Thus when the knob 25 is rotated in the right-hand direction, with the parts as shown in Fig. 2, the ends of the cross-pin 38 will traverse the spiral slots 40 and thereby lift the bolt 34 out of the socket 33. The upper end of each of the slots 40 is reversed as shown at 41 to form a bayonet lock to retain the bolt 34 in the raised position. The downward thrust on the knob 25 caused by the spring 35 is transmitted to the handle 13 through the bearing of the cylinder 24 on the upper end of the plug 20.

A disk 42 having a central opening 43 for the key 32 is movable axially in the space 44 in the knob 25 and is pressed upwardly by the springs 45 and 46 arranged, respectively, in the axially extending openings 47 and 48 in the cylinder 24, the springs being enclosed in small tubes 49 which are secured to the under side of the disk 42 and are slidable in said openings 47 and 48.

The key 32 has a cylindrical head 50 which is adapted to be positioned in the opening 51 in the knob 25 when the key is inserted in the barrel 23, as will be observed from Figs. 1 and 2. It will also be observed that when the key is in the lock the top of the head 50 is flush with the outer surface of the knob 25, thereby avoiding objectionable projections on the knob.

The operation of the device is as follows: With the parts in their positions as shown in Figs. 1 and 2, the gear-shift lever may be said to be unlocked and adapted to effect the shifting of the gears the same as a solid lever. The key 32 will be retained in the barrel 23 because the tumblers 52 have been carried around by the knob 25 a half-revolution from the position in which the key was inserted, this being a well known feature of the pin lock. As a matter of fact the key will be retained in the lock even when the knob is turned only slightly from the position in which the key is inserted. If the knob 25 is now rotated to the right the bolt 34 will be withdrawn from the socket 33 and when the knob reaches the position shown in Fig. 3, the key will be withdrawn by the disk 42 and springs 45 and 46 so that the head 50 will project above the surface of the knob and thereby enable the key to be readily removed. The sections 12 and 13 of the lever will then be disconnected and while the section 12 will be held in its position by the member 11 or its equivalent element in the gear shift mechanism, the section 13 may be swung in any direction, the ball 15 moving in the socket in lever.

Thus there has been accomplished what is analogous to "breaking" the lever and when the key 32 is again inserted in the lock and the knob turned back to the position illustrated in Figs. 1 and 2 the bolt 34 will be forced into the socket 33 when the sections of the lever are in proper alignment, thus, in effect, "mending" the "broken" lever.

It is preferable to have the handle 13 normally retained in proper alignment with the lever 12 when these parts are disconnected and to assist in thus holding the handle I have provided a sleeve 54 which is slidable on the lever 12 and has a flange 55 that bears against the lower end of the part 16 as shown in Fig. 1. A spring 56 surrounds the sleeve 54 and is compressed between the flange 55 and a collar 57 that is secured on the lever 12 by the pin 58, or in any other suitable manner.

While I have indicated right-handed spiral grooves 40, it will be readily understood that left-handed spirals may be used without affecting the mechanism in any way except to reverse the directions of rotation of the knob 25 for locking and unlocking.

While I have illustrated and described one form of my invention it is to be understood that the construction illustrated is susceptible of changes without departing from the spirit of the invention, as defined in the appended claims.

Having thus described my invention, what I claim is:

1. In a device of the class described, the combination of a lever comprising a plurality of sections, means for connecting and disconnecting said sections whereby they may be operated as a unit or one section operated independently of the other and yieldable means for retaining said sections in their normal relation when said connecting means is inoperative.

2. In a device of the class described, the combination of a lever comprising a plurality of sections one of which is the handle, a knob rotatably arranged on said handle section, means for rigidly connecting said sections whereby they are adapted to act as a unitary structure, cam means associated with said knob for actuating said connecting means, and means controlled by a non-rotatable key for locking said knob against rotation.

3. In a device of the class described, the combination of a lever comprising a plurality of sections one of which is the handle, a knob mounted on the end of said handle section and rotatable on the axis thereof, a member for connecting said sections whereby they may be operated as a unit or one section operated independently of the other, cam means operated by the rotation of said knob to actuate said member, and means controlled by a non-rotatable key for locking said knob against rotation.

4. In a device of the class described, the combination of a lever, a reciprocable locking member, a rotatable knob for actuating said member held against movement longitudinally of said lever, and means controlled by a non-rotatable key for locking said knob against rotation.

5. In a device of the class described, the combination of a lever, a reciprocable locking member, a rotatable knob on said lever for actuating said member held against movement longitudinally of said lever, a lock for securing said knob against rotation on said lever, and a key adapted to actuate said lock when housed entirely within said knob.

6. In a device of the class described, the combination of a lever, a locking member, a rotatable knob on said lever having an opening therein, means operatively connecting said knob and said locking member, a lock for securing said knob against rotation on said lever, and a non-turning key for said lock adapted when housed within said opening to unlock said knob.

7. In a device of the class described, the combination of a lever, a locking member associated therewith, a rotatable knob on said lever having a key-opening, a lock for securing said knob against rotation on said lever, a non-turning key adapted when housed within said opening to unlock said knob, and spring means for ejecting said key.

8. In a device of the class described, the combination of a lever, a locking member associated therewith, a rotatable knob on said lever for actuating said member, a lock comprising a barrel and a cylinder rotatable relative to the barrel, said barrel being secured to said lever and said cylinder being secured to said knob, whereby the lock is adapted to secure said knob against rotation, a key adapted when inserted in said barrel to release said knob, said lock being adapted to retain said key therein when said knob is turned from the position in which the key is inserted, and means within said knob for ejecting said key when released by the lock.

9. In a device of the class described, the combination of a lever, a locking member associated therewith, a rotatable knob provided with cam means for actuating said member, a lock comprising a barrel secured to said lever and a cylinder secured to said knob and rotatable therewith about said barrel, and automatically operated key-ejecting means within said knob.

10. In a device of the class described, the combination of a lever, a locking member associated therewith, a rotatable knob provided with cam means for actuating said member, a lock comprising a barrel secured to said lever and a cylinder secured to said knob and rotatable therewith about said barrel, said knob having a chamber therein, and spring pressed means movable in said chamber for automatically ejecting the key from said lock.

11. In a device of the class described, the combination of a lever comprising two sections hinged together, means whereby said sections may be connected so as to act as a unit, and spring means associated with the connection between said sections for yieldably holding said sections in their normal relation when adapted for relative movement.

12. In a device of the class described, the combination of a lever, a locking member, a knob movable on said lever to actuate said member, a lock for securing said knob against movement on said lever, and a non-turning key adapted to actuate said lock when housed entirely within said knob.

13. In a device of the class described, the combination of a lever, a locking member associated therewith, a knob movable on said lever for actuating said member, a lock comprising a barrel and a cylinder movable relative to the barrel, said barrel being secured to said lever and said cylinder being secured to said knob whereby the lock is adapted to secure the knob against movement, a key adapted when inserted in said barrel to release said knob, and said lock being adapted to retain said key therein when said knob is moved from the position in which the key is inserted.

In testimony whereof I affix my signature.

OLAF A. ANDERSON.